G. H. FRASER.
SEPARATOR.
APPLICATION FILED AUG. 28, 1914. RENEWED DEC. 18, 1918.
1,317,015.
Patented Sept. 23, 1919.
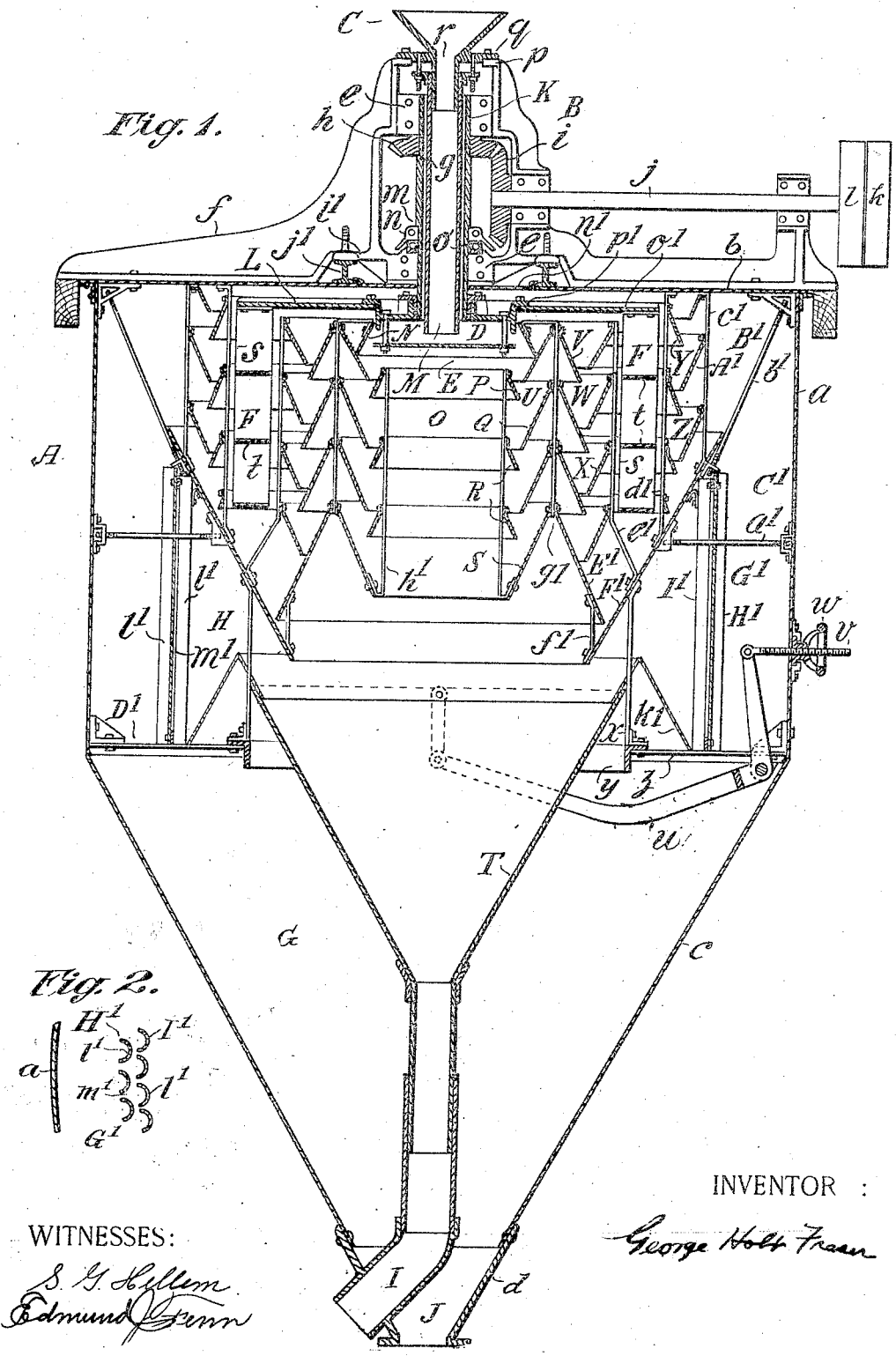
INVENTOR:
George Holt Fraser
WITNESSES:

UNITED STATES PATENT OFFICE.

GEORGE HOLT FRASER, OF BROOKLYN, NEW YORK.

SEPARATOR.

1,317,015.  Specification of Letters Patent.  Patented Sept. 23, 1919.

Application filed August 28, 1914, Serial No. 859,004. Renewed December 18, 1918. Serial No. 267,402.

*To all whom it may concern:*

Be it known that I, GEORGE HOLT FRASER, a citizen of the United States, residing at No. 226 Quincy street, in the borough of Brooklyn, county of Kings, city and State of New York, United States of America, manufacturer, have invented certain new and useful Improvements in Separators, of which the following is a specification.

This invention relates to apparatus for separating, sizing or classifying materials by means of a fluid current, and aims to provide certain improvements therein.

Heretofore it has been common to separate fine from coarse material by an air current, by passing the material through a casing in which a revolving blower created a current for floating the fine material out and depositing it in a dust chamber, after which the current was returned to the inner side of the falling material and again passed through it.

Attempts have been made to prevent coarse particles from being carried out with the fine, and to insure a uniform separation.

This invention relates to separators in which classification of the product is aimed at, and the invention aims to provide improvements whereby the product may be selected with greater certainty, or the material may be classified and separated into several grades.

The invention aims to provide an improved separator which will more certainly insure the absence of coarse material in the fine product, and which can be used to make several grades of material of different degrees of fineness, if desired.

To this end in carrying out the preferred form of the present improvements, the pulverized or other material to be treated is fed into the separator in an annular descending stream through which the current is drawn outwardly to float out the desired fines, a blower is provided outwardly of this stream, and surrounding the descending stream of material annular selecting or classifying means are employed, preferably between the stream and the blower and outwardly of the blower. The descending material is preferably fed into the separator and dropped downwardly between reverse annular distributing and collecting rings, which alternately spread and concentrate it, as well as retard its speed of descent. Outwardly of these are concentric annular passages of varying elevation so as to give an annular wave effect to the outflowing current. Downwardly directed deflectors encircling these passages vary the direction of the current to produce wave effects therein, and the dust carried by the current is subjected to circuitous travel and centrifugal action as the current winds past these deflectors, facilitating separation of the heavier particles from those light enough to float in the current despite its circuitous progress. Annular collecting troughs for the over-sized particles thus separated from the outwardly traveling current, are provided between the distributing rings and the blower, and collecting and return passages are provided for this intermediate product. Preferably a series of such deflectors, passages and troughs is disposed between the feeding rings and the blower, and a similar series is disposed outwardly of the blower, each in outward succession being more elevated than the next, so that the outwardly passing current is continually rising, and each having greater area than the preceding, so that the floating power of the current diminishes as it progresses outwardly, thus insuring that only material of the fineness which will float at the lowest speed of the current as it passes the final selecting provision, shall be carried to the settling chamber.

Beyond the selectors is a blower chamber from which through a contracting outlet the dust-laden current is projected at high speed downwardly into a large settling chamber, from which it is withdrawn in direction reverse to its introduction and at relatively low speed through a return passage, and again carried to within the falling mass of material, so that the same current is continuously used to float out the fines.

In the accompanying drawings Figure 1 is a vertical axial section of an air separator embodying the preferred form of the present invention, and Fig. 2 is a fragmentary horizontal section of the foraminous wall, in connection with which this form will be described in detail.

Referring to the drawing, let A indicate a casing, B the driving mechanism, C the feed hopper, D the distributer, E the feed chamber, F the blower, G the dust chamber, H the return passage, I the coarse outlet, and J the outlet, all of which parts may be of any usual or suitable construction.

The casing A consists of a cylindrical body $a$, a top $b$, and a conical bottom $c$ carrying a casting $d$ in which are formed the coarse and fine outlets.

The driving mechanism comprises a tubular shaft K mounted in upper and lower bearings $e$ in a bracket $f$ which supports the separator. The shaft K has an upper shoulder $g$ on which rests a bevel gear $h$ meshing with a similar gear $i$ carried by a shaft $j$ which is driven from fast and loose pulleys $k$ and $l$. The shaft K has a lower shoulder $m$ resting on a split collar $n$ which is supported by a ball bearing $o$ resting on the bracket $f$ near the lower end of the shaft.

The shaft K extends into the casing A and is separably connected to the head L of the blower, which it revolves.

The hopper C is movably and adjustably carried on a shelf $p$ of the bracket $f$, having a flange $q$ resting on this shelf, and a feed inlet $r$ coinciding with and discharging feed into an adjustable feed tube M which is slidingly fitted to the hopper so that it can be raised or lowered toward the distributer disk to regulate the speed of feed to the latter. The feed tube M passes freely through the drive tube so that the latter can rotate independently of it.

The distributer D is a revolving disk suspended from the fan head L, and is revolved with sufficient rapidity to throw off the material radially within the casing.

Surrounding the edge of the feed tube is a baffle ring or deflector N which deflects the incoming feed downwardly in an annular stream surrounding the suction chamber O of the separator. Beneath the disk D is an annular distributing ring P which distributes outwardly any material falling from the disk and not striking the deflector N. Below these are a series of collecting rings Q and a series of inner distributing rings R arranged in succession so that the descending material falling onto the ring Q slides down the ladder and is concentrated and discharged therefrom onto the distributing ring R, from which it is outwardly deflected and falls onto the next ring Q, from which it is again carried to the next ring R, by which it is again deflected and distributed onto the lower ring S, from which it falls to the coarse cone T. Above each ring Q is an annular upwardly extending current passage U through which the current traversing the falling material rises to pass over the adjacent collecting ring. Above this passage is a downwardly extending deflector ring V against which the rising current impinges, and by which it is deflected downwardly, so that it may pass outwardly under the lower edge thereof. Beneath each deflector is an annular selecting trough or space W having a bottom outlet for precipitating downwardly any coarse material deposited in the trough. The outer side of the trough is formed by an annular deflecting ring X, which reverses the descending current from the deflector V and directs it upwardly over the top edge of the adjacent ring X, over which it flows to the inner side of the blades $s$ of the blower F. The series of blades opposite the outlet from each trough are isolated by a partition $t$ from those opposite the adjacent outlet, so that variations of current through the different outlets cannot equalize and their uniform suction is maintained opposite each.

The blades of the blower are in the form of a barrel or cylindrical fan, revolving around the distributing and selecting disks.

Preferably outwardly of these blades are disposed a series of downwardly extending deflectors Y which direct downwardly the outflowing current from the blower into an annular trough Z, the outer wall of which consists of an upwardly extending deflector $A^1$, which directs the outgoing current upwardly toward the top of the blower chamber $B^1$. Any coarse material remaining in the current may be deposited by centrifugal action in the trough Z as the current undulates to pass the deflector Y, and only the material which is light enough to float over the upper edges of the outermost deflectors $A^1$ will then be carried to the blower chamber $B^1$.

The air blown into the chamber $B^1$ descends therein, and diminishes in speed immediately below the outer deflectors where the blower chamber has an enlarged portion $C^1$, below which the chamber has a contracting outlet $D^1$ through which the current descends, so that it escapes into the dust chamber G in a downward direction. Immediately inwardly of the annular passage $D^1$ is the return passage H, which where it communicates with the dust chamber is of relatively large area, and through which the current passes inwardly in reverse direction to its entrance to the dust chamber, so that the reversing of direction of the current and the diminution of its speed, both tend to facilitate the separation of the dust floating in it, which settles in the dust chamber.

The current rising through the return passes over the upper edge of the tailings cone T and back into the suction chamber, through which it again rises, and from which it passes outwardly through the selector passages.

The internal selecting troughs W discharge at the bottom onto a cone $E^1$, and unless it is desired to separately collect them, they are discharged onto a cone F¹ which receives the discharge from the outer series of selectors, and conducts the discharge from both selectors inwardly and drops it across the return duct into the cone T. The coarse material from the distributing cones descends from the lower cone into the tailings cone, and thus the returning current traverses inwardly through both the selector tailings and through the distributer tailings, and is enabled to float from either any dust therein fine enough to float with this current at its then speed.

The tailings cone is vertically adjustable to control the current speed, being in the construction shown adjusted by the forked lever $u$ operated by a screw $v$ and wheel $w$. This cone slides vertically within guides $x$ through a hub ring $y$ which is carried by spokes $z$ from the casing. The upper cones are positioned within the casing by adjustable spokes $a^1$, and suspended from the top by adjustable tie-rods $b^1$, and the intermediate deflectors and rings are carried from the cone F¹ by braces $c^1$, $d^1$, $e^1$, $f^1$, $g^1$ and $h^1$ respectively, so that the annular discharge spaces between them are continuous and uninterrupted, thus affording opportunity for uniform outlet of material without causing gaps through which excessive air current might flow.

Cross beams $j^1$ serve to stiffen the bracket $f$, and an outwardly flaring apron or cone $k^1$ reinforces the cone T and makes the dividing wall between the blower chamber and dust chamber, and serves as the lower wall of the return passage. The various rings or cones can be adjusted on their braces or otherwise to any relations desired so long as they are maintained concentric.

The various rings necessary to make the successive annular passages, the inner step by step distribution and retardation, and the changes in direction of current, as well as its variations in speed as it travels outwardly, may be formed and supported in any suitable way, according to the fineness desired for the final product, or the grade desired for the intermediate products which are selected out of the current by the selecting troughs.

In operation, material enters through the hopper C and descends through the feed tube M onto the disk D. The speed of feed is regulated by adjusting the tube M toward the disk. The disk centrifugally throws the material against the deflector, from which it is deflected downwardly in an annular stream, so that the falling material resembles a tubular wall surrounding the suction chamber O. As this material descends it is collected by the upper ring Q, which retards its speed of descent and concentrates it on the ring R, which redistributes it on the next ring Q, and so on, until it falls on the lower ring or cone S, from which it falls to the tailings cone T and escapes through the coarse outlet I.

The revolution of the blower causes an outward current from the suction chamber O to the blower chamber B¹, which current flowing through the falling material carries outwardly the dust and smaller particles. The current opposite each annular passage is isolated from the next by the intermediate partition $t$ of the blower, so that the falling material is successively acted on by a series of independent currents. The outflowing current passes through the falling material radially and approximately horizontally, and is then directed upwardly over the collecting cone through the passage U, which contracts the current to accelerate its speed and increase its carrying power, so that it may carry over the cone any particles that it has floated from the falling material. Above the cone the direction of the passage U is suddenly changed by the deflector V, which directs the current downwardly toward the trough W, in which owing to the greater diameter of this trough the speed of the current changes, so that its dust carrying ability is affected. The direction of the current in the trough W is again sharply changed upwardly by the deflector X, and during this change of direction and any accompanying variation of speed, the outflowing current is caused to drop in the trough W any pieces too large to be carried further. As the current rises up still higher over the outer edge of the trough W it goes to the blower, through which it passes outward.

For many purposes the trough W alone will effect sufficient selection to give the desired fineness for the material settling in the dust chamber, but where an intermediate grade, or a further selection or greater fineness is desired, one or more additional troughs are provided, preferably outwardly of the blower. The trough Z surrounding the blower is usually sufficient for the finest requirements. When this is used the current as it leaves the blower is directed downwardly in the trough Z by the deflector Y, and then again still farther upwardly by the cone ring A¹, the action on the floated material being analogous in this case to that in the trough W, except that even a finer selection is made here. From the blower or from the outer trough if used, the current rises toward the top $b$ and curves downwardly through the chamber B¹, into the larger portion C¹ thereof, in which it expands and becomes less agitated, and through which the fine material descends into the contracting outlet D¹, from which it is discharged rapidly downwardly into the dust chamber G.

The particles separated out by the trough W sift through the narrow annular interstice between the deflectors V and X and drop through the current, traversing the next succeeding passage until they descend onto the cone $E^1$. Thus should any dust escape from the current in an upper passage, it may be floated outwardly by the current in the succeeding passage, which while swift enough to float this dust, may not be swift enough to float larger particles. The particles selected out in the outer troughs Z will descend through the succeeding currents and be collected by the cone $F^1$. As shown, both these products will be brought together and escape through the annular space between the cones $E^1$ and $F^1$ and fall across the return current to the cone T. The escape passages between the cones for these selections are preferably sufficiently narrow to practically prevent of escape of current through them in either direction, and the lower cones $E^1$ and $F^1$ act substantially as a dam or partition across the lower edge of the blower, and should be arranged to substantially prevent direct return of air to cause the current to traverse through the dust chamber and the return passage to effect the desired operation.

The current will rise rapidly through the chamber O and distribute itself outwardly through the suction passages, continually changing in direction and expanding and rising until it reaches the chamber $B^1$. Its rapid descent into the latter will carry the dust floating with it downward. As its direction is reversed through the suction passage this will tend to throw out the dust centrifugally, and the relatively slow speed through the lower part of the return passage H will prevent the returning current from floating back much dust. Any dust which does float back with the current will be carried therewith up through the suction chamber, because of the high speed of the return current after it has passed over the top of the tailings cone T, which speed is accelerated until it is again passing out of the suction chamber.

The adjustment of feed by the feed tube M, and the speed of drive, having been determined, subsequent adjustment to control the current speed as desired will be made by raising or lowering the tailings cone T to diminish or increase the return passage above it. The fine dust will be removed through the outlet J and the coarse tailings through the outlet I, either continuously or otherwise as desired.

The internal parts can be adjusted as desired to obtain uniform relative positions and concentric relations. The distributing and collecting cones may be removed and replaced without disturbing the others.

While for many purposes the slow inward withdrawal of the returned air through the passage H transversely of its direction of flow through the chamber $C^1$ will sufficiently free the returned air from floating dust, in some instances it is desirable to more completely eliminate floating dust in the returned current, and for better disclosing their utilization, my present improvements are preferably illustrated as used in connection with my improved means for filtering dust in air separators which comprise an improved filter or dust collector $G^1$ intermediate of the blower and return passages and preferably surrounding the latter and inclosed by the former and adapted to be traversed by the inwardly flowing air and to extract floating particles therefrom, and deliver them into the dust chamber or elsewhere as desired in case another grade consisting of this product is preferred.

Preferably this constitutes a foraminous or interstitial wall intermediate of the blower and return chambers substantially cylindrically arranged around the latter and preferably stationary relatively to the adjustment thereof. Any suitable provision for this may be employed according to my invention, but I preferably provide an improved filter $G^1$ comprising one or more series $H^1$ and $I^1$. The series $H^1$ is composed of grooved or trough-shaped members $h^1$ arranged side by side, spaced in parallelism, with the hollow faces toward the approaching current, and spaced apart to form current slots or passages $m^1$ intermediate of them, and a second series $I^1$ of similar members $l^1$ similarly arranged at the lee side of the first series but staggered relatively thereto so as to bring their hollow sides opposite the air slots between the members of the preceding set. Any number of series may be used, but a plurality is preferable and two series usually sufficient for effectively filtering the fluid. These are preferably arranged vertically and the apron or extension $k^1$ of the return cone T slides up within them as the cone is adjusted to regulate the flow.

The filter members may be of suitable cross-section, better preferably semi-cylindrical, and as the current approaches them under the action of the suction within and the pressure without it forms dead spaces or voids opposite their faces as it flows between their edges, permitting floating particles to contact with the concaved face and slide down within the hollow side of the member through the comparative current void there existing.

The current passing through the slots between the outer members is arrested by the hollow side of the succeeding inner member, which forms a similar void or dead space in which the particles may collect and descend while the current is divided and deflected laterally to each side of this member in order to pass it and reach the return chamber, The troughs are elongated in the direction of down-flow of the current through the chamber $C^1$, and open-ended, and vertical, so that dust settling in them can descend into the dust chamber G without tendency to fall outwardly into the currents or eddies in the chamber $C^1$. When used they will be suitably arranged in the current passage to intercept and filter out and settle the material to be extracted, their arrangement in this instance being in concentric circular form because of the concentric disposition of the annular suction and discharge passages.

The frame $f$ has a forked front opening $i^1$, and the top $b$ has a cover $n^1$ fitting the space between the beams $j^1$, and the head L of the fan comprises an outer ring $o^1$ bolted on the hub or head $p^1$ which is separably connected to the tubular shaft K and to the ring $o^1$ so that it can be separated and lifted outwardly and forwardly between the beams to remove the shaft and distributing disk without disturbing the other parts.

It will be seen that this invention provides improvements in apparatus for grading, sizing or selecting materials which can be variously and advantageously utilized for current separation, and it will be understood that the invention is not limited to particular details of construction, arrangement or operation set forth as constituting its preferred form, since it can be employed in whole or in part according to such modifications as circumstances or the judgment of those skilled in the art may dictate, without departing from the spirit of the invention.

For the purpose of more completely disclosing the scope and applicability of the features incident to this invention which I prefer to claim in this application many features of improvement in separating, sizing and collecting machinery are herein shown and set forth but not specifically claimed in this application, being the subject matter of claims in my applications Serial Numbers:

267,401 filed December 18, 1918 (being a renewal of my original application 858,797 filed August 27, 1914);
859,145 filed August 29, 1914;
29,705 filed May 21, 1915;
69,024 filed December 28, 1915;
69,025 filed December 28, 1915;
104,706 filed June 20, 1916;
181,538 filed July 19, 1917;
231,599 filed April 30, 1918;
235,914 filed May 22, 1918;
281,445 filed March 8, 1919;
307,417 filed June 28, 1919;
307,418 filed June 28, 1919;
310,328 filed July 12, 1919, and
310,329 filed July 12, 1919.

What I claim is:—

1. In combination, a casing, means for causing a fluid current to flow therein, means for causing material to descend therein in a downward path across the direction of flow of such current, extracting means comprising upwardly and downwardly extending members at one side of said path having a lower outlet for coarse particles and affording between them a sinuous current passage, successive to said downward path of such descending material for receiving said current beyond said path, for extracting coarse particles carried by said current, a settling chamber succeeding said extending means and in communication with said passage, and means communicating between said settling chamber and the other side of said path.

2. In combination, a casing, means for causing a fluid current to flow therein, means for causing material to descend therein in a downward path across the direction of flow of said current, extracting means comprising upwardly and downwardly extending members affording a lower outlet for coarse particles and affording a plurality of sinuous current passages for receiving said current successive to the downward path of such descending material for extracting coarse particles carried by said current, and a settling chamber succeeding said extracting means and in free communication with two of said passages.

3. In combination, a casing, means for causing a fluid current to flow therein, means for causing material to descend therein in a downward path across the direction of flow of said current, selecting means at one side of said path comprising upwardly and downwardly extending members providing a lower outlet for coarse particles and a sinuous current passage for receiving said current successive to the downward path of such descending material for extracting coarse particles carried by said current, a settling chamber succeeding said selecting means and in communication with said passage, and means affording an adjustable return passage communicating between said settling chamber and the interior of said casing at the other side of said path.

4. In combination, a casing, means for causing a fluid current to flow therein, means for causing material to descend therein in a downward path across the direction of flow of said current, means at one side of said path providing a lower outlet for precipitated material and affording a sinuous passage for receiving said current successive to the downward path of such descending material for extracting particles carried by said current, and means affording a closed return passage receiving current leaving said sinuous passage and returning it to the interior of said casing at the other side of said path.

5. In combination, a casing, means for causing a fluid current to flow therein, means for causing material to descend therein in a downward path across the direction of flow of said current, selecting means providing a lower outlet for coarse particles and affording a sinuous current passage for receiving said current successive to the downward path of such descending material for extracting coarse particles carried by said current, a settling chamber succeeding said selecting means and in communication with said passage, and means affording a downward conduit for coarse material descending through said path and for particles extracted by said selecting means.

6. In combination, a casing, means for causing a fluid current to flow therein, means for causing material to descend therein in a downward path across the direction of flow of said current, selecting means at one side of said path providing a lower outlet for precipitated particles and affording a sinuous current passage for receiving said current successive to the downward path of such descending material for extracting coarse particles carried by said current, means affording a downward passage communicating with said passage succeeding said selecting means, means affording a settling chamber below and communicating with said downward passage, and means affording a current outlet from said downward passage intermediate of its extremities.

7. In combination, a casing, means for causing a fluid current to flow therein, means for causing material to descend therein in a downward path across the direction of flow of said current, selecting means providing a lower outlet for precipitated particles and affording a sinuous current passage for receiving said current successive to said path for extracting coarse particles carried by said current, supplementary selecting means providing a lower outlet for precipitated material and affording a sinuous current passage for receiving said current from and successive to said first mentioned sinuous passage for extracting particles carried by said current, and a settling chamber succeeding said supplementary selecting means and in free communication with said sinuous passage thereof.

8. In combination, a casing, means for causing a fluid current to flow therein, means for causing material to descend therein in a downward path across the direction of flow of said current, selecting means at one side of said path comprising a plurality of upwardly and downwardly extending superposed members providing lower outlets for precipitated particles and affording superposed sinuous current passages for receiving said current successive to said downward path for extracting particles carried by said current, and means affording a current passage successive to and communicating with a plurality of said sinuous passages receiving current therefrom for delivering it to the other side of said path.

9. In combination, a casing, means therein for causing a fluid current to flow therein, means for causing material to descend in a downward path in said casing across the direction of flow of said current, selecting means at one side of said path providing a lower outlet for particles and affording a sinuous current passage for receiving said current successive to the downward path of such descending material for extracting particles carried by said current, and means affording a communicating passage receiving current from said sinuous passage and delivering it to the other side of said path.

10. In combination, a casing, means for causing a fluid current to flow therein, means for causing material to descend therein in a downward path across the direction of flow of said current, selecting means at one side of said path affording a sinuous current passage successive to said downward path for receiving said current beyond said path for extracting particles carried by said current and affording an outlet for such particles below an intermediate portion of said passage, a settling chamber underneath said selecting means and in communication with said passage, and means below said selecting means affording a partition between the latter and said settling chamber.

11. In combination, a casing, means for causing a fluid current to flow therein, means for causing material to descend therein in a downward path across the direction of said flow, selecting means at one side of said path affording a sinuous current passage successive to said path for receiving said current beyond said path for extracting particles carried by said current and affording an outlet for such particles below an intermediate portion of said passage, a chamber successive to said selecting means and in communication with said passage, means affording a return passage communicating between said chamber and the other side of said path, and means below said selecting means affording a wall or partition between the latter and said return passage.

12. In combination, a casing, means for causing a fluid current therein, means for causing material to descend therein in a downward path across the direction of flow of said current, selecting means at one side of said path affording a sinuous current passage successive to said path for receiving said current beyond said path for extracting particles carried by said current and affording an outlet for such particles below an intermediate portion of said passage, a dust chamber successive to and receiving current from said sinuous passage, and means affording a return passage above said dust chamber for returning such current above the latter to the other side of said path.

13. In combination, a casing, means for causing material to descend therein in an annular path, a blower surrounding such path for causing a current to flow outwardly through such material, and means within said blower and between it and the descending material for determining the size of material carried out by such current comprising annular means affording a current passage and a precipitate outlet, and a settling chamber succeeding said blower.

14. In combination, a casing, means for feeding material thereto, means for causing such material to descend therein in an annular path, a blower concentric of such path for causing a fluid current to flow outwardly across such path, selecting means surrounding said path comprising reversely inclined walls providing a lower outlet for particles and affording a sinuous current passage for receiving said current successive to said path for extracting coarse particles carried by said current, an annular passage successive to and receiving such current from said sinuous passage and affording communication between the outer extremity of said sinuous passage and the inner side of said path.

15. In combination, a casing, means for causing a fluid current to flow therein, means for causing material to descend therein in an annular downward path, annular selecting means outwardly of and concentric of said path and comprising reversely inclined walls providing a lower outlet for precipitated particles and affording a sinuous outwardly extending current passage for receiving said current successive to said path for extracting coarse particles carried by said current, an annular chamber successive to and communicating with said sinuous passage for receiving current therefrom, and means below said selecting means affording communication between said annular chamber and the space within said annular path.

16. In combination, a casing, a blower therein having a plurality of isolated sections, means for feeding material to said casing inwardly of said blower, a plurality of rings for causing such material to descend in an annular path in said casing, and means communicating between the spaces between said rings and the sections of said blower respectively for causing the current produced by one section thereof to flow outwardly between two of said rings, and that produced by another section thereof to flow outwardly between succeeding rings and means affording outlet passages for material precipitated between said rings, and a settling chamber succeeding said rings.

17. In combination, a casing, means for feeding material thereto, a plurality of feeding rings therein, an annular trough surrounding said rings, a blast chamber surrounding said trough, a dust chamber in communication with said blast chamber, a return passage leading from said dust chamber to within said rings, and means for causing a fluid current to flow through said chambers and means affording an outlet passage for material precipitated in said trough.

18. In combination, a casing, means for causing a fluid current to flow therein, means for causing material to descend therein in an annular path, means comprising a plurality of spaced annular walls surrounding said path and providing a lower outlet for precipitated material and a sinuous current passage at the outer side of said path for receiving said current successive to said path for extracting coarse particles carried by said current, an annular chamber successive to and in free communication with said sinuous passage, and means affording a communicating passage between said chamber and the space within said annular path.

19. In combination, a casing, means for causing a fluid current to flow therein, means for causing material to descend therein in an annular path, annular selecting means providing a lower outlet and affording a sinuous current passage for receiving said current successive to said path for extracting coarse particles carried by said current, and means affording an annular downwardly extending passage successive to and communicating with said sinuous passage for receiving current flowing therefrom, means affording an adjustable annular current passage below said selecting means and communicating between said annular passage and the space within said annular path, and means affording a tailings outlet for precipitated material traversing said return passage.

In witness whereof, I have hereunto signed my name in the presence of two subscribing witnesses.

GEORGE HOLT FRASER.

Witnesses:
  JOSEPH E. HYLAND,
  GUSTAV SCHONHEIT.